No. 782,280.          Patented February 14, 1905.

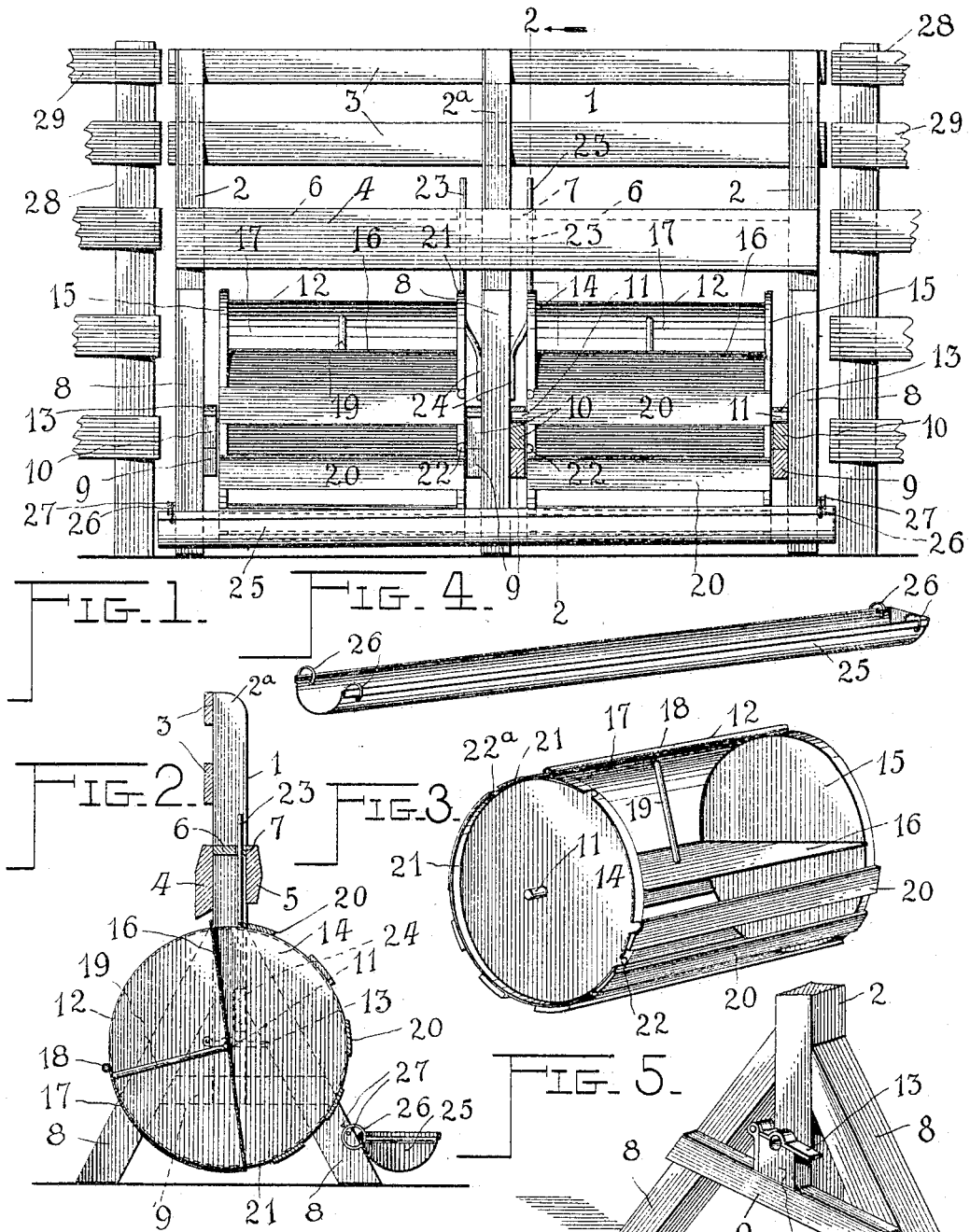

UNITED STATES PATENT OFFICE.

GAVIN SHAW, OF LINDENWOOD, CANADA.

FEED-TROUGH.

SPECIFICATION forming part of Letters Patent No. 782,280, dated February 14, 1905.

Application filed January 23, 1904. Serial No. 190,416.

*To all whom it may concern:*

Be it known that I, GAVIN SHAW, a subject of the King of Great Britain, residing at Lindenwood, county of Grey, Province of Ontario, Canada, have invented certain new and useful Improvements in Feed-Troughs; and I do hereby declare that the following is a full, clear, and exact description of the invention, such as will enable others skilled in the art to which it appertains to make and use the same.

My invention relates to feed-troughs.

The object of the invention is to produce a portable trough which is especially adapted to facilitating the feeding of animals without permitting them to soil the food within the trough by standing in the same and also especially adapted for enabling animals to be fed through the fence of a pen in which they may be confined. The invention is intended to be especially useful in connection with the caring of calves, swine, &c.

The invention contemplates the employment of a rotatable trough or rotatable troughs set up in a portable frame, and by reason of the fact that this construction enables the trough to be rotated so that its opening may be brought to the outer side of the pen the filling of the trough and cleaning of the same is greatly facilitated, enabling the attendant to do his work without being molested by the animals.

The invention consists in the construction and combination of parts to be more fully described hereinafter and definitely set forth in the claims.

In the drawings which fully illustrate my invention, Figure 1 is a rear elevation of the feed-trough, illustrating the same as constituting a portion of the fence of a pen. Fig. 2 is a vertical cross-section taken substantially on the line 2 2 of Fig. 1. Fig. 3 is a perspective of a rotatable member of the trough. Fig. 4 is a perspective of a gutter or drain which may be used in connection with my invention. Fig. 5 is a perspective of a portion of the frame of the trough.

Throughout the drawings and specification the same numerals of reference denote like parts.

Referring more particularly to the parts, 1 represents a rack or frame formed with vertical posts 2 preferably three in number, as indicated, which are connected above by horizontal rails 3, which are disposed above main stringers 4 and 5, which are attached, as shown, on opposite sides of the said posts. Between the stringers 4 and 5 and between the posts 2, horizontal shelves 6 are placed, which shelves, adjacent to the central post $2^a$, are provided with slots or openings 7, as indicated. These slots are for a purpose which will appear more fully hereinafter. Near the lower portions of the posts 2 laterally-projecting diagonal braces or feet 8 are attached, the same constituting bases upon which the frame 1 rests. For the purpose of giving additional rigidity cross-bars 9 may be attached, as indicated most clearly in Fig. 5.

Upon the faces of the cross-bars 9 bearing-blocks 10 are arranged, the same constituting supports for trunnions 11, which are carried by rotatable troughs 12. As indicated most clearly in Fig. 1, the troughs, which are preferably two in number, would be mounted in the lower portion of the frame between the bases of the posts 2. In order to facilitate the removal of these troughs when desired, the bearing-blocks 10 are provided with pivoted caps 13, as shown most clearly in Fig. 5. The troughs 12 comprise substantially circular heads 14 and 15, which are connected by a diametrically-disposed plate 16, and this plate, in connection with a cylindrically-curved plate 17, constitutes a trough. Near the edge 18 of the plate 17, which constitutes the edge of the trough, there is attached a cross-bar 19, which passes to substantially the central point of the plate 16, as indicated in Fig. 3. This cross-bar 19 affords means for separating the animals eating at the trough, it being understood that the trough described is intended especially for feeding two animals. The rear side of each trough comprises a plurality of longitudinally-disposed bars or slats 20, which connect the heads 14 and 15, as shown.

When the animals are feeding, the troughs would occupy substantially the position shown in Fig. 2, so that the edge 18 would be sufficiently depressed for this purpose. In order to enable the troughs to be locked in this position or in other positions, the heads 14, which lie adjacent to the central post 2ª, are formed with laterally-projecting flanges 21, which flanges have notches 22 formed therein, as indicated. These notches 22 are adapted to coöperate with resilient lock bars or springs 23, which are attached to the faces of the post 2ª, as indicated at 24, and which project upwardly through the slots 7, as indicated. These lock-bars normally maintain themselves against the edge of the flanges and will hold themselves in the notches once they have been placed there. There would be a plurality of these notches 22, as indicated, so as to facilitate the adjustment of the trough into any desired position suited to the kind of animals which were being fed, and one of the notches, as 22ª, would be located in such a position as would operate to throw the opening of the trough into a reversed position or nearly the position in which it is shown in Fig. 3, the trough then being disposed toward the outside of the pen, so as to enable the attendant to clean the same or to place food therein. Evidently by throwing the lockbars 23 toward the central post they could be displaced whenever desired, so as to enable the troughs to be rotated and afterward held in any position required.

Where it is desired to clean the troughs frequently, a gutter or drain 25 is employed, the same being attached, substantially as indicated in Figs. 1 and 2, by means of rings 26, which would be received over nails 27 or similar fastening devices carried by opposite members of the diagonals or feet 8. One end of the gutter 25 would be open, as shown, which end of course would be depressed when the gutter was attached in the manner just suggested.

In practice the frame 1 would be constructed so that it would be readily portable with the rotatable troughs, and it is expected that this frame would be arranged, as indicated in Fig. 1, so that it would constitute a portion of the fence 28 of a pen, the rails 29 of this fence being discontinuous at the trough, as indicated.

The trough described would be very clean and efficient, enabling the animals to be attended with little inconvenience. If food should become frozen in the trough, it could be readily removed by rotating the trough until it came into an inverted position, whereupon hot water would be poured upon the back of the same until the contents should become thawed and fall out.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In combination, a rack, a feed-trough rotatably mounted upon a horizontal axis in said rack, said feed-trough having a horizontally-projecting flange with notches therein, and a resilient lock-bar which may be received by any of said notches.

2. In combination, a rack, a feed-trough rotatably mounted therein upon a substantially horizontal axis, said feed-trough having substantially circular heads and a substantially diametrically disposed plate connecting said heads, one of said heads having a laterally-projecting flange and notches therein, and a resilient member attached to said rack and adapted to engage said notches.

3. In combination, a rack, feed-troughs rotatably mounted in said rack, means for locking said feed-troughs in a plurality of positions, and a detachable drain adapted to be attached to the lower portion of said feed-rack and in a position to receive the contents of said troughs.

4. In a device of the character described, a rack provided with an opening therein, a rotatable member mounted in said opening, said member comprising heads, a trough extending for a portion of the area of said heads, and means connected with the heads for filling that portion of said opening not closed by the said trough.

5. In a device of the character described, a rack provided with an opening therein, rotatable heads mounted in said opening, a trough mounted on said heads and covering less than the whole area thereof, slats connected with said heads exterior of the trough, and resilient locking means normally locking said trough in position.

6. In a device of the character described, a rack, a trough rotatably mounted therein, said trough having substantially circular heads, a laterally-projecting flange on one of said heads, said flange being provided with a plurality of notches therein, and a resilient member on said rack adapted to engage with said notches.

7. In a device of the character described, a rack, heads rotatably mounted in an opening therein, trough-plates connected with said heads, slats connected with said heads exterior of said trough to form a closure for said opening when the trough is in elevated position, and a resilient member normally in engagement with said heads.

In witness whereof I have hereunto set my hand in the presence of two witnesses.

GAVIN SHAW.

Witnesses:
CHAS. H. MOORE,
DUNCAN MORRISON.